United States Patent Office 3,289,162

Patented Nov. 29, 1966

3,289,162

METHOD AND SYSTEM FOR SUPPRESSING DEFECTS OF SCANNING SIGNALS IN THE AUTOMATIC IDENTIFICATION OF CHARACTERS

Rolf Jurk and Norbert Schürzinger, both of Munich, Germany, assignors to Siemens & Halske Aktiengesellschaft, Berlin, Germany, a corporation of Germany Filed Apr. 9, 1964, Ser. No. 358,478
Claims priority, application Germany, Apr. 11, 1963, S 84,676
22 Claims. (Cl. 340—146.3)

Our invention relates to methods and systems for the processing of signals resulting from the scanning of legible characters, such as numerals, letters or symbols, as required for automatically identifying the characters to issue corresponding control signals to an output device for selectively controlling it in dependence upon the character being scanned.

Such identification of characters is applied in communication and data processing systems where the characters are read by an optical or photoelectrical scanner, and the scanner signals upon processing by character identifying equipment, are used for controlling a printer, typing mechanism, computers, punching device or other output apparatus.

The automatic identification of characters is often effected on the basis of so-called form or shape elements (signature components) contained in the character. For this purpose the character is scanned, as a rule by columnar scanning, and the resulting two kinds of scanner signal elements are utilized for recognizing therefrom the presence of given character form elements. That is, when the scanning point, traveling in one of the parallel scanning columns, passes over an area element covered by the character, it produces a signal element "1" sometimes called a "black signal" whether the character appears in black or any other color. When the scanning point during scanning travel encounters an area element of the background, a signal element "0" is produced, this signal being sometimes called "white signal" regardless of the actual background color. The scanner signals, therefore, are of the binary type, and the duration of each corresponds to a length along the scanning sweep.

The automatic identification of a character by processing of such scanner signal elements in logic circuits is based on the supposition that a character being identified possesses just those form elements as are contained in an ideally shaped character of the same meaning.

In practice, however, all characters exhibit greater or lesser irregularities departing from the ideal shape. Such irregularities may be constituted, among others, by small, more or less elongated holes in the dark character area, or by small interruptions extending all the way through a portion of the character. Although, in general, such departures are limited, they may suffice to aggravate, prevent or falsify the automatic identification because such irregularities may result in ascertaining, in a character being scanned, the presence of form elements that would not occur in the ideal shape of the character, at least not at the particular location.

It is known from the German published patent application DAS 1,076,984 and the Austrian Patent 209,967 to pass the scanner signals, for automatic identification of a character, through a low-pass filter which does not transmit very short signals. This suppresses very short scanner signals as may be caused, for example, by small impurity spots on the background paper. It is further known from the periodical "Data Processing," January-March, 1959, page 14, to eliminate short signal pulses, resulting from the scanning of slight soiling in the vicinity of a character or from small gaps in the dark character area, by providing an auxiliary circuit which effects an integration and pulse-length discrimination of the scanner signals. The known devices, however, entail a reduction in resolving power of the entire scanning and identifying system because the lowpass filter or the integrating and pulse-length discriminating circuits can transmit only relatively long signal pulses which correspond to the black-value or white-value of a correspondingly large area element.

Also known, from the German published patent application DAS 1,136,861, is a system for the scanning of characters printed with magnetic ink, in which the scanner signals pass through so-called gap-filling circuits that respond without delay but drop off with some delay, thus eliminating the effects of error signals as may result from ink-free localities within the character areas. A serially next following circuit of delayed response and undelayed drop-off, serves to prevent expanding the signal length. A further circuit responding with delay but dropping off without delay, eliminates the effect of short signal pulses as may be caused, for example, by squirted ink spots in the vicinity of the character-covered areas proper. The delay in response inherent in such equipment also reduces the resolving power of the entire identifying system because it permits transmitting only those signal pulses that correspond to the median black-value of a correspondingly enlarged area element. Furthermore, such a system, operating with drop-off delay, can eliminate only those error signals that stem from narrow interruptions in the inked area within a character that extend substantially at a right angle to the direction in which the character is being scanned by the individual magnetic scanner heads.

The U.S. Patent 3,072,886 (Austrian Patent 210,927) describes a system for identification of characters which is equipped with a pre-sorting or classifying network. After comparing each two directly successive scanner signal elements stemming from the columnar point-by-point scanning of a character, the pre-sorting network issues at one of three respective outputs a signal pulse which indicates a scanner signal element pair "11," a scanner signal element pair "00," and another signal element pair which is neither a pair "11" nor a pair "00." For recognizing so-called characterizing (signature) components, all of the signal pulses arriving subsequent to a pulse indicative of such a pair "11" or "00," are counted until again there occurs a signal pulse indicative of a scanner signal element pair "00" or a pair "11." As a result, any narrow interruptions contained in a character portion and not exceeding the height of an area element, remain without disturbing effect upon the recognition of the characterizing components. In this manner, however, gaps within a line portion of the character can be bridged only if they extend substantially in a direction perpendicular to the scanning columns. Furthermore, this way of suppressing error signals is predicated upon the particular type of the characterizing components and their recognition; that is, this method does not afford any liberty with respect to the choice of the identifying principle or method to be employed for the automatic identification of the characters.

Compared with the methods and systems heretofore available, our invention resides in a fundamentally different way of suppressing scanner signal errors caused by small interruptions in the line-portions of characters or other defects in characters to be automatically identified, and pursues the general object of obviating the above-mentioned shortcomings and disadvantages heretofore encountered.

More particularly, it is an object of our invention to afford the suppression of the above-mentioned defects in scanner signals independently of the particular method and means subsequently employed for the identification of character form elements from the scanner signals Another, conjoined object is to afford such a suppression of error signals not only with respect to those stemming from small interruptions perpendicular to the scanning columns, but also those resulting from the scanning of character interruptions extending substantially parallel to the scanning columns.

It is also an object of our invention to afford a suppression of error signals caused by slight interruptions in a character that extend parallel to the scan-column direction as well as perpendicularly thereto, while nevertheless operating with a columnar scanning sweep which need only once be performed with respect to the entire area of the character and its background.

Another object of our invention is to achieve the desired suppression of error signals resulting from the abovementioned defects in the characters being scanned, without thereby appreciably affecting the resolving power of the character-identifying operations.

To achieve these objects, and in accordance with our invention, we proceed as follows. During the scanning of a character, we recognize and store by suitable logic components the occurrence of sequences of scanner signal elements "1" in which the number of these elements is at least a given minimum along a line in a given one of the two coordinate scanning directions. That is, we recognize and store in this manner either the "1" sequences occurring along a scanning column (vertical coordinate direction), or those that occur next to each other in a number of adjacent columns (horizontal direction). We further identify the subsequent occurrence of scanner signal elements "0" in the same coordinate line and place a signal element "1" in ready condition for a given limit number of such "0" elements counted. The stored signal "1" element sequences are then transferred from storage to the output of the signal suppressing system within a given interval of time delay synchronized with the scanning operation; and, during the delayed transfer, the previously readied signal "1" element is substituted for the above-mentioned, identified signal "0" element, but only in the event a given minimum number of positionally adjacent signal elements "1" recurs during the transfer delay interval within a given number of successive coordinate lines.

For suppressing error signals caused particularly by character interruptions extending parallel to the scanning columns, we preferably proceed by recognizing and storing the occurrence of a pair of scanner signal elements "11" in a "horizontal" line of scan extending perpendicular to the direction of the columns. When the area element next following on the same horizontal line results in a scanner signal element "0," we place a signal element "1" in readiness; and thereafter transfer the latter element "1" in substitution of the scanner signal element "0" in the event the next following area element on the same horizonal line results in a scanner signal element "1," the substitution being made during the interval of time delay in which the scanner signal elements are being passed from the input to the output where they appear liberated from the otherwise existing signal errors.

For suppressing error signals stemming from character interruptions that extend perpendicularly to the scanning columns, it is preferable, in accordance with another feature of our invention, to recognize and store by means of logic components, the occurrence of a pair of scanner signals "11" resulting from character area elements adjacent to each other in one and the same "vertical" scanning column, and recognizing any occurrence of a scanner signal element "0" as may result from the area element next following in the same scanning column. A signal element "1" is then kept ready for substitution of the element "0," but such substitution is made only in the event a signal element "1" is ascertained from the immediately following area element in the same column, and at the time when the scanner signal elements are being transferred to the output with a delay corresponding to the duration of a scanning column.

According to further, more specific features of our invention, a system for the suppression of errors in character scanning signals is designed as follows. An input signal bus lead is provided which supplies from the scanner the individual signal elements resulting stepwise from the columnar scanning of a character. This lead is connected to a logic memory or (first) storer whose bit storage capacity is adapted to the scanning operation and sufficient for storing a scanner signal element, as well as any additional signal elements as may occur in the course of columnar scanning until there occurs the scanning element to be compared with the one stored. The stored scanner signal element thus reaches the output of the storer with the just-mentioned delay. This storer output is connected to an inhibit gate (main inhibit gate) whose lock-input is connected to the signal input bus lead. A second storer, also having the above-mentioned storage capacity, is connected to the output of the inhibit gate. A third storer, likewise of the above-mentioned storage capacity, has its input connected to the signal bus lead to receive the scanner signal elements therefrom. A coincidence gate network has three inputs which are connected respectively to the output of the second storer, the output of the third storer and to the bus lead. The output of the coincidence network provides the corrected output signal The network between the third storer and the output lead is conductive only in the event of coincidence of a given minimum number of scanner signal elements "1" on the bus lead if the second storer is simultaneously activated.

According to a more elaborate embodiment of the invention, an intermediate storer, also having the abovementioned storage capacity, as well as an AND gate are serially interposed between the first storer and the main inhibit gtae This AND gate has two inputs connected to the bus lead and to the output of the first storer respectively, the output of the AND gate being connected to the input of the intermediate storer.

The system may be further provided with alternately successive, additional inhibit gates, each having its lockout input connected to the bus lead, as well as with respective additional storers having the above-mentioned capacity, these additional gates and storers being interposed between the first-mentioned (main) inhibit gate and the above-mentioned coincidence gate network. When in such a system the coincidence network is conductive, it transfers to the output lead a number of signal elements "1" that correspond to the number of storers located between the main inhibit gate and the coincidence gate network.

According to still another feature of our invention, we provide the system with additional storers, all having the above-mentioned storage capacity, the number of these storers corresponding to that of the storers connected between the main inhibit gate and the last gate of the abovementioned coincidence gate network. The additional storers have their outputs connected to the signal output lead and serve to transmit thereto the scanner signal elements from the bus lead with a delay corresponding to the sum of their storage capacities.

Circuit systems embodying the above-mentioned features of our invention afford the suppression of error signals resulting from the scanning of character interruptions extending essentially in the direction of the scanning columns, as well as from interruptions extending transversely of these columns. It will be noted that the transfer of a signal element "1" in lieu of an element "0" stemming from the scanning of an area element, is effected in dependence upon the result of the scanning operation in the vicinity of further area elements located in the vicinity of the area element on which the signal element "0" originated. By virtue of this principle, the error signals are suppressed without reducing the resolving power and without dependency upon any particular principle of character identification to which the corrected signals may be subsequently subjected.

The above-mentioned and more specific objects, advantages and features of our invention, said features being set forth with particularity in the claims annexed hereto, will be apparent from, and will be mentioned in, the following description of embodiments illustrated by way of example on the accompanying drawings in which:

Figure 6:
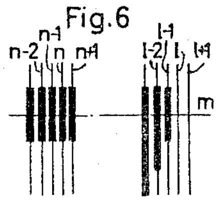

A signal-error correcting system according to the invention may receive its input signals from an optical scanner. The characters to be used, such as those printed on a sheet of paper, are scanned in narrow parallel strips, and the electric pulses resulting, for example photoelectrically, from the dark and light areas, are issued as the scanner signal. Such an optical scanner is schematically shown at SC in FIG. 8 as furnishing the scanner signal through a bus lead *n*. The scanner SC is shown connected by a synchronizing line T to a synchronizing generator CL (master clock). Details of the scanner are not illustrated and described herein because various scanners suitable for the purpose of the invention are known and commercially available as components, and because the particular details of the scanner used are not essential to the invention proper. Reference may be had, for example, to the U.S. Patent 2,877,951 (FIGS. 6 and 50). Suitable scanners are available, for example, from the assignee of the present invention or from the manufacturers listed under "Optical Scanning" on pages 52 to 54 in No. 10 of Computer Equipment Comparison Series, published by McGraw-Hill Publishing Company, Inc., New York.

In conjunction with the following description of signal correction systems according to the invention, the operation of an optical scanner in the event of a character defect will be explained with reference to FIGS. 1 and 2 of the accompanying drawings.

Figure 1:
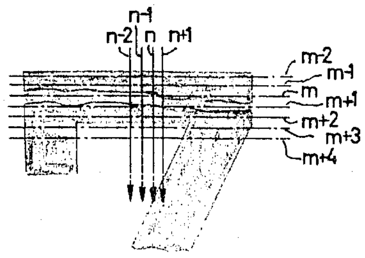
FIGS. 1 to 7 are explanatory diagrams relating to the scanning of a character to be identified and the elimination of signal errors.

FIG. 1 shows greatly enlarged a portion of a character to be scanned, exemplified by the upper portion of numeral "7." The scanning proceeds in parallel sweeps along "vertical" columns such as those denoted by $n-2$, $n-1$, $n$, $n+1$. The scanning point travels step by step downwardly through each sweep (scan), advancing point by point at moments determined by synchronizing (clock) pulses. For example, the scanning point travelling downward on scan $n-2$ passes sequentially and stepwise through the heights denoted by the "horizontal" lines $m-2 \ldots m+4$. (It will be understood that the terms "vertical" and "horizontal" as used herein serve only for conveniently defining the two coordinate scanning directions relative to each other but need not, in fact, be vertical or horizontal in any other sense.)

When the scanning point has reached the lowermost step of travel, it switches immediately to the top point of the next scan $n-1$, and then passes sequentially through respective scanning points located at the same heights $m-2 \ldots m+4$. Depending upon whether the scanning point encounters a "black" area element of the character, or a "white" area element of the background, the scanner issues a signal element "1" or a signal element "0."

Figure 2:
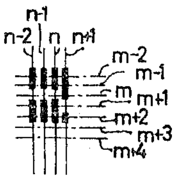

FIG. 2 is a schematic representation of the signal conditions thus resulting from the scanning of the character portion shown in FIG. 1. The vertical lines corresponding to the respective scans are shown thin at localities where the scanning point is located on a "white" area element, and are shown heavy at the localities of a "black" area element. If one traces in FIG. 2 the junction points between each heavy and thin portion of the vertical scan lines, it will be noted that these points define transverse curves which correspond to the contours of the character portion shown in FIG. 1.

The character portion shown in FIG. 1 exhibits an interruption extending from the left edge to the right edge, substantially in a direction transverse to that of the scans. During scanning, the interruption results in the production of scanner signal elements "0" at places where they would not occur when scanning an ideally shaped numeral "7" and which therefore constitute error signals. These error signals are also apparent from FIG. 2 where they constitute interruptions in the heavy line portions that denote the signal condition "1." Such error signals are suppressed by a signal transfer system according to the invention, such as the one shown in FIG. 8 and described presently.

The signals from the scanner SC enter into the system through the signal input bus lead *n*. An AND gate GS11 has one of its two inputs directly connected to the bus lead *n*, the other input being connected to the same bus lead through a 1-bit storer SS1, such as a bistable flip-flop. The output of gate GS11 is connected through a 1-bit intermediate storer SS11 to the main input of a main inhibit gate GS110 whose lock-out input is likewise connected to the bus lead *n*. The output of inhibit gate GS110 is connected through an OR gate OGS with another 1-bit storer S1S110, the other input of the OR gate OGS being connected to the bus lead *n*. The out-put of inhibit gate GS110 is further connected directly to an additional 1-bit storer **S1*v* whose output is connected to the main input of another inhibit gate GS1*v*0** whose lock-out input is also connected to the signal bus lead *n*. The output of inhibit gate **GS1*v*0 is connected to the lock-out input of a further inhibit gate IS1*v*0 whose main input is connected to the above-mentioned 1-bit storer S1S110**. The output lead *w* of the last-mentioned inhibit gate **IS1*v*0** constitutes the output lead of the entire system and serves to issue the corrected scanner signals.

Each of the above-mentioned storers, consisting of a bistable flip-flop, has its reset input connected through a negator (inverter) NE to its own set input. The synchronizing clock pulses for each storer are supplied from the same synchronizing signal generator (master clock) whose clock-pulse line T is connected to the scanner SC. The gates, 1-bit storers shown in FIG. 8 as well as in FIGS. 9, 10, 11 and 16, and also the shift registers still to be described, may consist of components known and available for logic circuits. In this respect reference may be had, for example, to volumes 4 and 6 of Computer Basics, published by Howard W. Sams and Co., Inc., New York. We prefer employing gates and flip-flop storers of the solid-state semiconductor type as described in the following German literature: "Entwicklungsberichte der Siemens and Halske AG," volume 22, 2nd series, pages 159 to 171, August 1959; or "Nachrichtentechnische Fachberichte," vol. 14, 1959, pages 25–29.

The system shown in FIG. 8 operates as follows.

Assume that during scanning, the scanning point in column $n-2$ has arrived at line $m-2$. Since a "black" area element of the character is situated at this locality, a scanner signal element "1" occurs on the signal bus *n*. This signal is written through the OR gate OGS into the 1-bit storer S1S110 in synchronism with the next clock pulse supplied to the same storer through the synchronizing line T, i.e. with a delay of one clock-pulse interval. At this moment the inhibit gate **IS1*v*0** is open so that the pulse "1" passes to the signal output lead *w*. Simultaneously the 1-bit storer SS1 is activated from bus *n*. After a clock-pulse interval, namely at the moment when the signal element "1" passes from the storer S1S110 to the output line *w*, another scanner signal element "1" appears on bus $n$, this signal stemming from the scanning of the next following character area element located in scan $n-2$ on line $m-1$. The latter signal element "1" is again transferred through the 1-bit storer S1S110 to the output lead $w$ with a delay of one clock-pulse interval. When the latter signal element "1" on bus $n$ occurs, it establishes the coincidence condition for the AND gate GS11 so that the 1-bit intermediate storer S11 is activated simultaneously with the transfer of the signal element "1" to the output lead $w$. The activation of storer SS11 is indicative of the fact that two directly successive scanner signal elements "1" have occurred in the column $n-2$ just being scanned.

The scanning point in scan $n-2$ has now reached the height of line $m$. Here it encounters a "white" area element in the above-mentioned interruption of the illustrated character portion. Consequently, a scanner signal element "0" now occurs on bus $n$. As a result, coincidence now exists for the main inhibit gate GS110. When the next clock pulse occurs, the bus $n$ cannot pass a scanner signal element "1" through the OR gate OGS into the 1-bit storer S1S110. In lieu thereof, the other input of the OR gate OGS, connected to the inhibit gate GS110, now receives from storer S1S110 a signal element "1" and is thus made ready for transfer. This ready condition is simultaneously written into storer S1$v$.

The storer S1S110 passes the readied signal element "1" to the main input of the inhibit gate IS1$v$0, when the next scanner signal element occurs on bus $n$. This next signal element, corresponding to scan $n-2$ and line $m+1$, is a signal element "1," referring to the scanning conditions represented in FIG. 1, and thus blocks the inhibit gate GS1$v$0 which at this moment is prepared for coincidence because the storer S1$v$ is activated. Consequently, a signal element "0" is passed to the lock-out input of the inhibit gate IS1$v$0 and opens the inhibit gate IS1$v$0 for the signal element "1" kept ready in the storer S1S110. Thus this signal element "1" is transferred to the output lead $w$. In this manner the scanner signal element "0" corresponding to the "white" area element in scan $n-2$ on line $m$, is substituted by virtue of the fact that a scanner signal element "1" has occurred during scanning of the next following area element in the same scan $n-2$.

The signal element "1" stemming from the area element in scan $n-2$ at line $m+1$ is transferred, analogously to the functions described above, through the OR gate OGS, the 1-bit storer S1S110 and the inhibit gate IS1$v$0, to the output lead $w$ with a delay of one clock-pulse interval, and now the 1-bit storer SS1 is again activated.

The next following scanner signal element "1," resulting from the scanning of the following area element on coordinates $n-2$ and $m+2$, is transferred to the output lead $w$ with a one-pulse delay, and the 1-bit intermediate storer SS11 is activated simultaneously.

The then following scanner signal element arriving on signal bus $n$ is an "0" element, referring to the scanning condition of FIG. 1. The signal element thus appears in the lock-out input of inhibit gate GS110 and opens it for a "1" signal element to pass from storer SS11 through gates GS110 and OGS. Consequently, a signal element "1" is placed in readiness in storer S1S110, and this is marked by simultaneously activation of storer S1$v$.

The next following area element, situated in scan $n-2$ at line $m+4$, is likewise white so that the corresponding next signal element on bus $n$ is again the element "0." This opens the inhibit gate GS1$v$0, so that storer S1$v$ issues a lock-out signal "1" through gate GS1$v$0 to the lock-out input of inhibit gate IS1$v$0. This takes place just at the moment when the signal element "1" previously held ready in storer S1S110 is passed to the main input of the inhibit gate IS1$v$0. This signal element "1," therefore, is not transmitted through the now closed inhibit gate IS1$v$0. Hence on output lead $w$ there obtains not the signal condition "1" but the signal condition "0."

Figure 8:
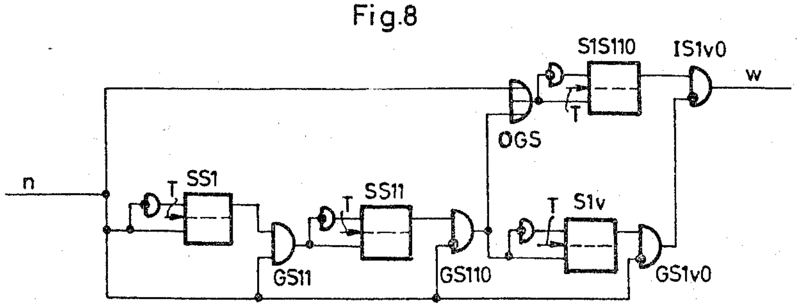
FIGS. 8 to 11 show diagrammatically four different signal-error suppression systems according to the invention.

The system shown in FIG. 8 operates analogously during the further scanning of the character portion represented in FIG. 1. Consequently, instead of the scanner signals which the system receives on its signal input bus $n$ according to FIG. 2, the signal output lead $w$ issues signals of the type schematically represented in FIG. 3.

Figure 3:
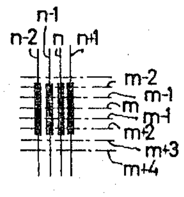

In accordance with FIG. 2, the continuance of signal condition "1" within individual scans is represented in FIG. 3 by a heavy line portion, and the existence of signal condition "0" by a thin portion of the scan line. The interruptions of the signal condition "1" apparent from FIG. 2 and resulting from the interruption of the character portion shown in FIG. 1, are no longer present in the corrected signals according to FIG. 3. That is, the error signals stemming from the scanning of the defective character portion are suppressed, and the signal output lead $w$ of the system shown in FIG. 8 furnishes signal elements of the kind obtained if the character portion being scanned had the ideal shape shown in FIG. 7. Consequently, a character identifying network connected to the line $w$ would respond to the corrected scanner signals as if the character had the desired area properties. (An identifying network is not described herein because not essential to the invention proper.)

Briefly summarized, the corrective performance in the system of FIG. 8 is achieved by virtue of the fact that it recognizes and stores the occurrence of signal element pairs "11" resulting from the scanning of two area elements adjacent in one and the same (vertical) scanning column; and, when the next following area element in the same scanning column produces a signal element "0," the system places a signal element "1" in readiness and subsequently transfers it in lieu of the element "0" to the signal output lead with a delay of one scanning step (clock pulse), but only in the event the next subsequent area element in the same scan produces a signal element "1." If the last-mentioned area element does not result in producing a signal element "1," then the previously received scanner signal element "0" is transferred to the signal output lead with the above-mentioned one-step delay, and the available substitute "1" element is then cancelled.

Figure 9B:
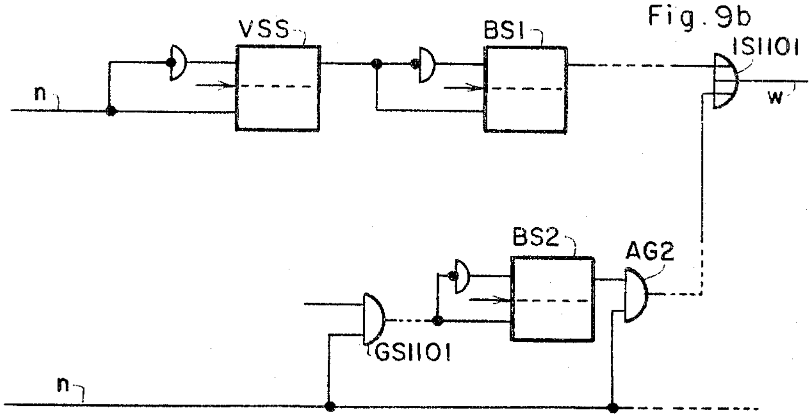
Figure 9:
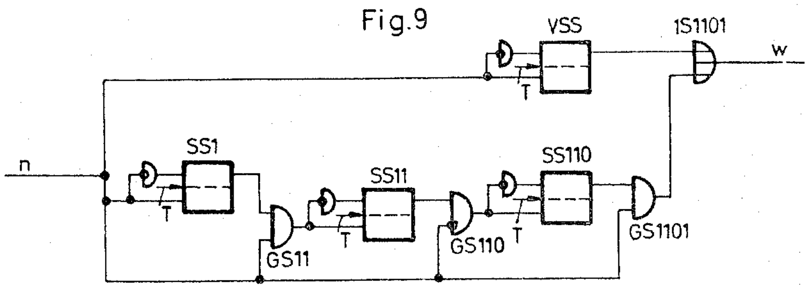

The same method is performed by the somewhat different circuit system illustrated in FIG. 9.

The signal input bus $n$ according to FIG. 9 receives scanner signal elements as schematically represented in FIG. 2, from the scanning of a character as exemplified in FIG. 1. The set input of a 1-bit storer VSS is directly connected to the bus $n$ and passes the arriving scanner signal elements "1," each time with a delay of one scanning step (clock pulse), to one of two inputs of an OR gate 1S1101 to be transferred to the signal output lead $w$. The storer VSS, as well as each other 1-bit storer mentioned herein, preferably consists of a flip-flop, such as a transistor circuit, having two (set and reset) inputs and one output. The signal input bus $n$ is also connected to the set input of a 1-bit storer SS1 whose output is connected to one of the two inputs of an AND gate GS11 whose other input is likewise connected to the signal bus $n$. Although in FIG. 9 the storers VSS and SS1 are shown separate, they may be formed by one and the same 1-bit storer, if desired.

Coincidence for the AND gate GS11 exists whenever two directly successive scanner signal elements "1" have occurred within the same scanning column. The occurrence of such a pair "11" of scanner signal elements is stored in a 1-bit intermediate storer SS11 whose set input is connected to the output of the gate GS11. The output of storer SS11 is connected to the main input of an inhibit gate GS110 whose lock-out input is connected to the signal bus line $n$. Consequently, the inhibit gate GS110 is open only when within a scan to directly successive scanner signal elements "1" are immediately followed by a scanner signal element "0." If this is the case, a signal element "1" is placed in readiness to be transferred in lieu of the signal element "0." This is done by issuing a signal "1" through the inhibit gate GS110 and the activation of the storer SS110 which takes place with the next following scanning step (clock pulse).

Connnected with the output of storer SS110 is one input of an AND gate GS1101 whose other input is connected to the bus $n$. When the storer SS110 is activated, the AND gate GS1101 is prepared for coincidence; however it passes the signal element "1," previously readied in the storer SS1101, only if simultaneously a scanner signal element "1" again occurs on bus $n$ so that coincidence is established for the AND gate GS1101. Gate GS1101 has its output connected to the other input of the above-mentioned OR gate 1S1101 whose output furnishes the corrected signals to the signal output lead $w$ of the system.

The system thus eliminates errors from the scanner signals arriving on the input bus $n$, and issues the corrected signals to the output lead $w$ by virtue of the following performance. The scanner signal elements "1" arriving on bus $n$ are transferred to the output lead $w$ through the 1-bit storer VSS (shown in the upper portion of FIG. 9), each time with a delay of one scanning-step interval; and the storers and gates shown in the lower portion of FIG. 9 operate, each time at the occurrence of a scanner signal element "0" immediately following two directly succesive elements "1" and directly preceding a further scanner signal element "1," to issue a signal element "1" to the output lead $w$ in replacement of the signal element "0" Consequently, when a character portion as exemplified in FIG. 1 is being scanned and the arriving scanner signal elements correspond to those represented in FIG. 2, the signal output lead $w$ of the system shown in FIG. 9 operates to issue corrected signal elements as indicated in FIG. 3. The system of FIG. 9, therefore, is also effective to suppress error signals resulting from character interruptions extending transversely of the scanning columns.

The method of the invention has been described so far with reference to two circuit systems in which the substitution of a signal element "1" for a scanner signal element "0" is made dependent upon the occurrence of the signal elements "0" in direct succession to a sequence of two scanner signal elements "1" in the same scanning column and upon re-occurrence of a scanner signal element "1" immediately following the element "0." However, the conditions of signal substitution can be modified, namely so that the substitution is made dependent upon the preceding occurrence of a direct sequence which comprises not only two "1" elements but any desired larger number, or the substitution can be made dependent upon re-occurrence of the scanner signal element "1" within any desired number of scanning-step intervals of the particular scanning column, so that a signal element "1" is placed in ready condition and may be substituted for a plurality of directly successive "0" elements rather than for only one "0" element.

For such purposes, the above-described circuit systems can be modified by providing them with a plurality of 1-bit storers instead of the individual storers shown in FIGS. 8 and 9 and described in the foregoing. This wil be further explained with reference to a corresponding modification of FIG. 9 separately illustrated in FIG. *9a* where the same reference characters are used as in FIG. 9, so that reference may be had to the foregoing for a description of the individual components and their functioning.

According to FIG. *9a*, there are connected, between the first AND gate GS11 and the first inhibit gate GS110, a plurality of 1-bit storers SS11 with an intermediate AND gate GS11 between each two storers. Each of these storers has a one-step delay interval. The number of the SS11 storers corresponds to the desired number of consecutive signal elements that constitute the minimum length of the sequence of elements "1." While only two such storers are shown in FIG. *9a*, any desired additional number may be inserted, this being indicated by a broken-line connection between the last storer SS11 and the first inhibit gate GS110.

Furthermore, a plurality of component groups are connected between the just-mentioned inhibit gate GS110 and the AND gate GS1101. Each of the latter groups comprises a 1-bit storer SS110 and an inhibit gate GS110 between each two succesive ones of these storers. The number of the storers SS110 thus connected in series corresponds to the chosen limit number of scanner signal elements "0" for which a single signal element "1" is to be placed in readiness. Again only two storers SS110 are illustrated, but any desired additional number of storers may be inserted as is indicated by a broken-line connection. A plurality of 1-bit storers VSS, equal in number to that of the storers SS110, is connected between the signal bus $n$ and the upper input of the OR gate 1S1101. Preferably each of the latter storers, with the exception of the first storer VSS, has its input connected with the output of the immediately preceding storer VSS through an OR gate OG which has two further inputs of which one is connected to the output of an AND gate AG. The gate AG has one of its two inputs connected to the signal bus $n$. The other input is connected to the output of the one storer SS110 that corresponds as to its sequential position to the next preceding storer VSS. The other input of the OR gate OG is connected to the next following 1-bit storer SS110, if present.

By virtue of these additional circuit connections, not only a sequence of scanner signal elements "0" correspondig to the chosen limit number, but also a shorter sequence of elements "0" will result in substitutionally transferring a corresponding sequence of signal elements "1."

The system of FIG. 9 can be further modified, in analogy to the modifications described with reference to FIG. *9a*, by substituting for the single AND gate GS1101 a plurality of serially connected AND gates, a 1-bit storer being interposed between each two of these gates. This requires inserting a corresponding number of 1-bit storers between the storer VSS and the OR gate 1S1101. With such a modification the transfer of signal elements "1" in substitution of signal elements "0" is made dependent upon the recurrence of not one but any desired larger minimum number of signal elements "1."

A modification of this type is shown in FIG. *9b*, representing only the circuit portion which in FIG. 9 is located between the storer VSS and AND gate GS1101 on the one hand and the OR gate 1S1101 on the other hand, it being understood that the same circuit portion may also be added to the system according to FIG. *9a* immediately preceding the OR gate 1S1101.

As shown in FIG. *9b*, an additional AND gate AG2 follows the AND gate GS1101 with an interposed 1-bit storer BS2. A corresponding 1-bit storer BS1 is inserted between the storer VSS and the OR gate 1S1101. Further pairs of components BS2–AG2 and BS1 may be added in the circuit portion indicated by broken lines.

In analogy to the modifications described above with reference to FIGS. 9 and *9a*, the circuit system shown in FIG. 8 can also be modified for recognizing during a scan the occurrence of a larger sequence of scanner signal elements "1" corresponding to a given minimum length, and to place in readiness a signal element "1" each time a given plurality of signal elements "0" follows immediately after the above-mentioned "1" sequence, so that the ready signal element "1" is subsequently substituted, in dependence upon the above-mentioned conditions and while the scanner signals are being transferred to the output lead with a delay corresponding to the given limit number of the signal "0" sequence.

Such a modification of the system according to FIG.

Figure 8A:
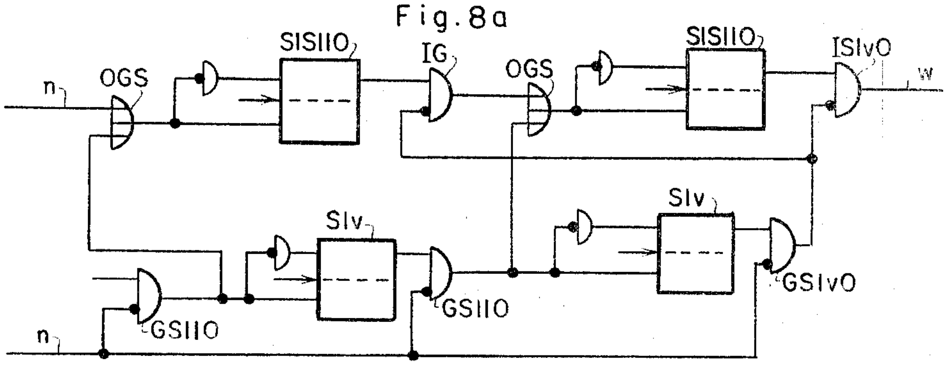
FIGS. 8*a*, 9*a*, 9*b*, 10*a*, 11*a* show respective modifications.

8 is shown in FIG. 8a which illustrates only the modified portion located substantially at the right of gates OGS and GS110 of FIG. 8.

According to FIG. 8a, each of the inhibit gates GS110 directly preceding one of the additional 1-bit storers S1v (only one such storer being shown in addition to the one provided in the system of FIG. 8) is connected with a further input of an OR gate OGS which precedes the first additional 1-bit storer S1S110. Each additional storer S1S110 is connected with the next following 1-bit storer through an inhibit gate IG whose lock-out input is connected to the lockout input of the inhibit gate IS1v0 from which the signal output lead w extends.

By the method and means described and explained above with reference to FIGS. 8, 8a, 9, 9a and 9b, any interruptions in the character to be scanned, extending substantially transverse to the scanning columns and sufficiently large in the direction of the columns to constitute defects, can be eliminated as regards their effect upon the scanner signals so that they can no longer impair the subsequent identification of character form elements needed for identifying the character as a whole. However, as mentioned above, the invention also affords eliminating the effect of character interruptions that extend substantially parallel to the scanning columns. For explaining this, reference will be made to FIG. 4 which again shows the upper portion of numeral "7" by way of example.

The character is being scanned along the vertical columns $n-1$, $n$, $n+1$ . . . $1'-2$, $1'$, $1'+1$, the scanning being point by point as explained above with reference to FIG. 1. Depending upon whether the scanning point is located on a black character area or on a white background area, a scanner signal element "1" or a signal element "0" is produced.

Figure 4:
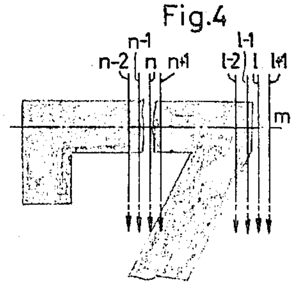
Figure 5:
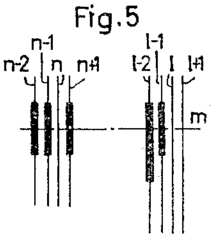

FIG. 5 shows schematically the scanner signal conditions resulting from the scanning of the character portion shown in FIG. 4, the heavy line portions denoting the persistence of the scanner signal "1," and the thin line portions the persistence of the signal "0."

The character illustrated in FIG. 4 is interrupted vertically across its area. During columnar scanning, the interruption results in scanner signal elements "0" which would not occur if the character were ideal. These error signals appear in FIG. 5 as a thin line which extends in the scan $n$ parallel to those localities where the adjacent scans show the persistence of the scanner signal condition "1." Such error signals "0" stemming from character interruptions in the direction of the scanning columns, are suppressed according to the invention by means of a circuit system as exemplified in FIG. 10 and described presently.

Figure 10A:
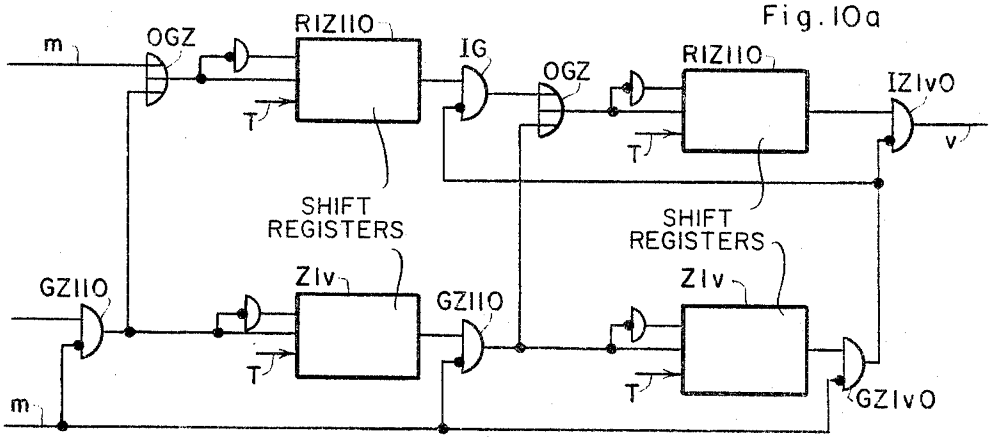
Figure 10:
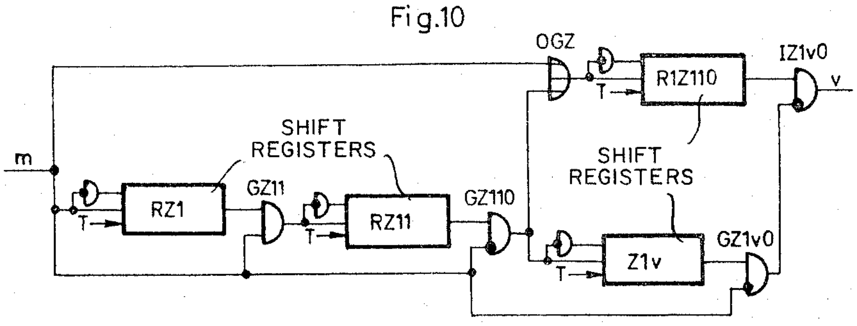

In the system illustrated in FIG. 10 the signals from the scanner pass on a signal input bus line $m$ to a shift register RZ1 with a bit storage capacity of as many signal elements as are produced during scanning of one column. In other words, the length of the shift register RZ1 coresponds to that of a scan. It will be understood that for synchronizing purposes the register RZ1, as well as each other storer and register described in this specification, is connected by a clock-pulse line T to a master clock as shown in FIG. 8.

Connected to the output of the shift register RZ1 is one input of an AND gate GZ11 whose other input is connected to the signal bus $m$. The output of gate GZ11 is connected to a second shift register RZ11, also having the length of a scan, whose output forms the main input of an inhibit gate GZ110 which has its lock-out input attached to the signal bus $m$. The output of the inhibit gate GZ110 also leads to a further shift register R1Z110, likewise having the length of a scan, an OR gate OGZD being interposed which has two inputs of which one is connected to the output of the inhibit gate GZ110 and the other to the signal bus $m$. An additional shift register Z1v of one-scan length is directly connected to the output of gate GZ110. The output of shift register Z1v is connected through an inhibit gate GZ1v0 to the lock-out input of a further inhibit gate IZ1v0, the lock-out input of inhibit gate GZ1v0 being attached to signal bus $m$. The main input of inhibit gate IZ1v0 is joined with the output of shift register R1Z110. The signal output line $v$ of the system extends from the output of the inhibit gate IZ1v0 and provides the scanner signals liberated from errors that may be contained in the scanner signals arriving on bus $m$. This will be further explained in the following.

Assume that during scanning of the character portion shown in FIG. 4, the scanning point arrives in scanning column $n-2$ at the height of the horizontal line $m$ where a black area element, forming part of the character, is located. Consequently, a scanner signal element "1" appears on the signal input bus $m$ of the system shown in FIG. 10. This signal element "1" is written into the shift register R1Z110 through the upper input of the OR gate OGZ, and is also written into the shift register RZ1. The signal elements "1" are then shifted through the two registers, step by step in accordance with the clock pulses supplied through the synchronizing lines T, and are issued at the respective register outputs after an interval of time as long as the time required for scanning a single column.

Consequently, at the moment when the signal element "1" appears at the outputs of respective registers R1Z110 and RZ1, the scanning of the character portion shown in FIG. 1 has just progressed to the area element on line $m$ in the next following scan $n-1$. Only at this delayed moment is the scanner signal element "1" transmitted from shift register R1Z110 through the now open inhibit gate IZ1v0 to the signal output lead $v$.

Simultaneously the bus $m$ now supplies the scanner signal element "1" stemming from the area element in scan $n-1$ on line $m$, and this "1" element is written into the two above-mentioned shift registers analogously to the performance described. At the same time, the newly arriving scanner signal element "1" on bus $m$, conjointly with the signal element "1" now issuing from the output of shift register RZ1, establishes coincidence for the AND gate GZ11, so that a signal element "1" is also written into the next shift register RZ11. The latter signal element is again shifted through the register RZ11 in synchronism with the further progress of the scanning operation.

Now assume that during further scanning, the scanning point in the next scan $n$ arrives at the height of line $m$. At this moment the scanner signal element "1" stemming from the black area element in scan $n-1$ on line $m$ is just being transferred to the output lead $v$. However, the signal element now arriving in bus $m$ is an "0" element because the area element in scan $n$ on line $m$ is situated in the interruption of the character. Consequently, at this moment, no signal element "1" is written from bus $m$ into the shift register R1Z110. However since, simultaneously with the occurrence of the scanner signal element "0" on bus $m$, there occurs a signal element "1" at the output of shift register RZ11, the now open inhibit gate GZ110 passes a signal element "1" from register RZ11 through the lower input of OR gate OGZ into the shift register R1Z110. The latter signal element "1" is thus placed in readiness for the scanner signal element "0" just resulting from the scanning operation. This readying is marked by simultaneously writing a signal element "1" into the shift register Z1v.

When during further scanning the scanning point in the next scan $n+1$ arrives at the height of line $m$, the signal bus $m$ again receives a scanner signal element "1." This signal element blocks the lock-out gate GZ1v0 and thus prevents it from transferring the previously entered signal element "1" now appearing at the output of shift register Z1v. Consequently, no lock-out pulse can pass from gate GZ1v0 to inhibit gate IZ1v0 so that the latter gate is open for the signal element "1" which just now occurs at the output of shift register R1Z110. As a result, this signal element "1" is transferred to the output lead $v$ in substitution of the scanner signal element "0" which, one scan previously, has arrived on signal bus $m$.

The scanner signal element "1" that occurs on signal bus $m$ at the moment of transfer is written into the shift register R1Z110 analogously to the operations already described and, after this signal passes through the register, it is transferred to the output lead $v$ with a delay corresponding to the duration of a scan.

Further assume that the scanning has progressed to scanning column $l-2$ and down to line $m$. At this moment a scanner signal element "1" occurs on bus $m$ and is written into the shift register R1Z110 to be transferred to the signal output lead $v$ upon a delay equal to the duration of a scan. Simultaneously with entering of the signal element into register R1Z110, a signal element "1" is also entered into the shift register RZ1.

Upon the duration of another scan, namely when the scanning point in the next scan $l-1$ arrives at line $m$, a scanner signal element "1" again appears on bus $m$ and is again written into the shift registers R1Z110 and RZ1. Simultaneously, this signal, conjointly with the signal element "1" just now appearing at the output of register RZ1, establishes coincidence for the AND gate GZ11, so that a signal element "1" is also written into the next following shift register RZ11.

At the moment when the scanning point in the next following scan $l$ reaches the line $m$, a scanner signal element "0" occurs on bus $m$. Simultaneously, the signal element "1" corresponding to the area element in scan $l-1$ on line $m$ is being issued to the output lead $v$. The signal element "0" on bus $m$ opens the inhibit gate GZ110 which passes a signal element "1" from register RZ11 through the lower input of the OR gate OGZ into the shift register R1Z110, where the signal element remains in ready condition. This readying operation is simultaneously marked by writing a signal element "1" also into the shift register Z1v.

According to FIG. 4, the scanning column $l$ is already located at the rear of the character portion. Consequently when the scanning point in scan $l+1$ arrives at the height of line $m$, the scanner signal element "0" again occurs on signal bus $m$ and results in the transfer of the signal element "1," simultaneously appearing at the output of shift register Z1v, through the inhibit gate GZ1v0. The signal element "1" therefore reaches the lock-out input of the inhibit gate IZ1v0 and prevents the transfer of the signal element "1" from shift register R1Z110, where it has been kept in readiness, to the output lead $v$. Consequently, at this time there obtains on the signal output lead $v$ not the signal condition "1" but the condition "0" corresponding to the area element defined by the scanning coordinates $l$ and $m$.

The system of FIG. 10 operates in a corresponding manner when area elements at the height of other horizontal lines are being scanned, in which case the resulting signal elements are passed through the shift registers in respectively different phase positions.

Instead of the scanner signals arriving at the signal bus $m$ in accordance with schematic representation in FIG. 5, the system furnishes at its output lead $v$ corrected signals as represented in FIG. 6. A comparison of FIGS. 6 and 5 will show that the absence of scanner signal elements "1" in scan $n$, stemming from the vertical interruption of the character portion shown in FIG. 4, is eliminated in the corrected signals. For those area elements within scan $n$ that are adjacent to black area elements in the immediately preceding scans $n-1$ and $n-2$ and in the immediately subsequent scan $n+1$, the scanner signal elements "0" have been substituted by signal elements "1." The error signals manifested by these scanner signal elements "0" have thus been suppressed, and the output lead $v$ furnishes signal elements as they would occur if the character being scanned had the regular, uninterrupted shape illustrated in FIG. 7. That is, with respect to any character-identifying circuitry connected to the output lead $v$, the vertical interruption in the character portion according to FIG. 4 has been, in effect, eliminated.

To briefly summarize the performance of the system according to FIG. 10, it will be understood from the foregoing that the correction is achieved by virtue of the fact that the system recognizes and stores the occurrence of a pair of scanner signal elements "11" stemming from the scanning of area elements directly successive along a "horizontal" line perpendicular to the direction of the scanning columns, and places in readiness a signal element "1" if a scanner signal element "0" results from the scanning of the area element next adjacent in the same horizontal line, the readied signal element "1" being thereafter substituted for the element "0" at the end of a signal transfer interval equal to the duration of a single scan; but the substitution is made only in the event the scanner signal element "1" is produced by the scanning of the area element next following on the same horizontal line upon the one that produced the "0" signal element.

Figure 11:
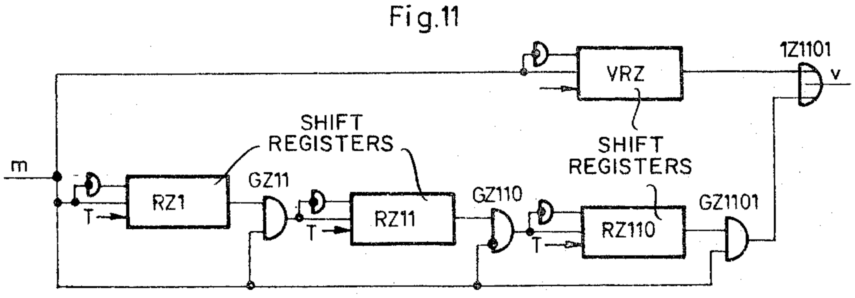

The same method is involved in the operation of the circuit system illustrated in FIG. 11. The scanner signal elements, resulting for example from the scanning of the character portion shown in FIG. 4 and represented in the diagram of FIG. 5, pass on the signal input bus $m$ directly to a shift register VRZ which possesses a storage capacity that permits the storing of as many scanner signal elements as occur during a single scanning column. Hence, register VRZ transfers the scanner signal elements "1" through one input of OR gate 1Z1101 to the output lead $v$ with a one-scan delay. Also connected to bus $m$ is a shift register RZ1 of the same storage capacity. The output of register RZ1 is connected to one of the two inputs of an AND gate GZ11 whose other input is connected to the bus $m$. The registers VRZ and RZ1 shown separately in FIG. 11, may be constituted by one and the same shift register, if desired.

Coincidence for AND gate GZ11 exists whenever, during columnar scanning of a character, a black area element is being scanned in a column at the height of a horizontal line on which a black area element is located also in the immediately preceding column. In the event such a pair "11" of signal elements occurs, the AND gate GZ11 wires the signal element "1" into a shift register RZ11 connected to the output of gate GZ11 and having the above-mentioned one-scan storage capacity. This signal element "1" passes stepwise through the shift register RZ11 in synchronim with the further progress of the scanning operation and appears at the output of register RZ11 at the moment when the scanning point, now passing through the next following scan, arrives at the height of the above-mentioned horizontal line.

If a white area element is situated in the latter scan at the same height so that a scanner signal element "0" occurs on bus $m$, the coincidence condition is satisfied for an inhibit gate GZ110 whose main input is connected to the output of register RZ11 and whose lock-out input is connected to bus $m$. Consequently, the inhibit gate GZ110 is opened when two black area elements immediately precede a white area element in three successive scans at the height of one and the same horizontal line. In this event, a signal element "1" is placed in ready condition by writing it from register RZ11 through the now open inhibit gate GZ110 into a shift register RZ110 also having the above-mentioned storage capacity of one full scan. Connected to the output of shift register RZ110 is one input of an AND gate GZ1101 whose other input is connected to the signal bus $m$. When a signal element "1," readied as described above, appears at the output of register RZ110 with a time delay of one scan, the gate GZ1101 is prepared at its upper input for subsequent coincidence; but it can transfer the readied signal element "1" only if simultaneously a scanner signal element "1" arrives on signal bus $m$ to complete the coincidence condition.

The signal from the AND gate GZ1101 passes to the other input of the above-mentioned OR gate 1Z1101 whose output goes to the signal output lead $v$ of the entire system.

Figure 7:
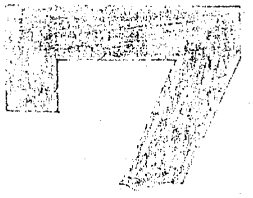

The signal output lead $v$ in the system of FIG. 11 thus furnishes corrected signals by virtue of the fact that the scanner signal elements "1" arriving on the signal input bus $m$ are transferred to the output lead $v$ through the shift register VRZ with a delay corresponding to the length of a scanning column, and that, when a scanner signal element "0" arrives upon occurrence of scanner signal elements "1" at the corresponding moments in each of the two directly preceding scans and prior to occurrence of another scanner signal element "1" at the corresponding moment in the next following scan, the shift registers and gates shown in the lower portion of FIG. 11 operate to transfer to the signal output lead $v$ a signal element "1," again delayed by the duration of a scan, in substitution of the signal element "0." For example, when a character portion as shown in FIG. 4 is being scanned and the signal input bus $m$ according to FIG. 11 receives the scanner signal elements schematically represented in FIG. 5, then the signal output lead $v$ of the system issues signal elements as would be obtained according to FIG. 6 if a non-defective character portion according to FIG. 7 were being scanned. The error signals resulting from the vertical interruption in FIG. 4 are suppressed.

Figure 9A:
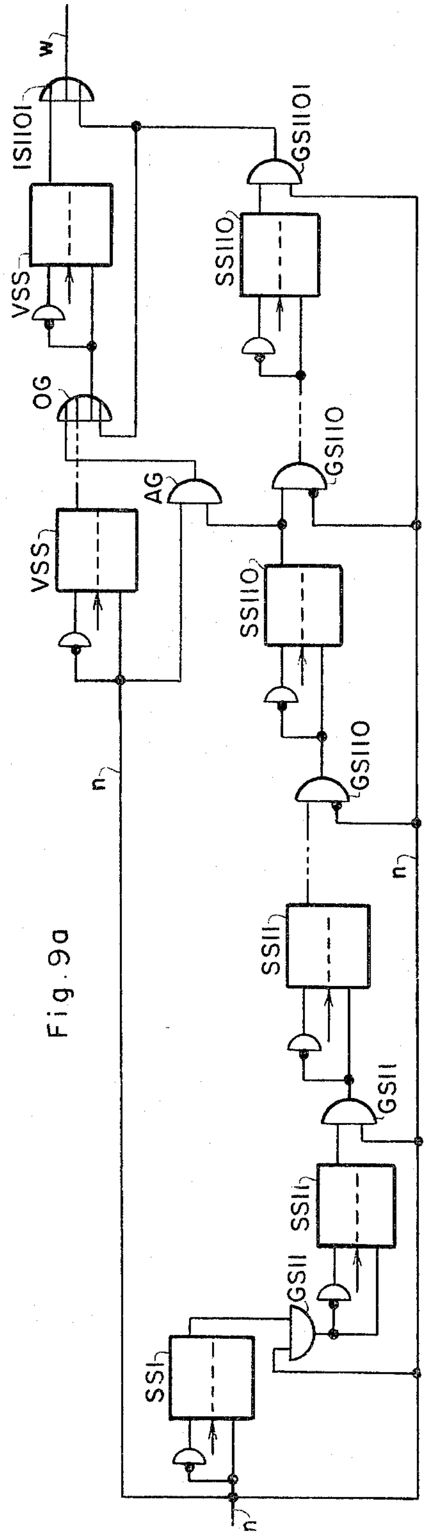

The system designs and operations exemplified above with reference to FIGS. 10 and 11 can be modified in analogy to the modifications explained with reference to FIGS. 8*a*, 9*a* and 9*b*. That is, the substitution of the signal element "1" for a scanner signal element "0" need not necessarily be dependent upon preceding occurrence of a pair of signal elements "1," but may also be made dependent upon preceding occurrence of a different minimum length with respect to the sequence of positionally corresponding scanner signal elements "1" in adjacent scans. Furthermore, such substitution can be made dependent upon subsequent occurrence of more than one scanner signal element "1" in a respective plurality of subsequent scans, so that a signal element "1" is placed in readiness and, as the case may be, transferred to the output lead, for a corresponding plurality of white area elements or scanner signal elements "0" located directly beside each other in respectively different scans.

For such purposes the system according to FIG. 11 can be modified by adding additional shift registers and gates as will be described presently with reference to FIG. 11*a* which largely corresponds to FIG. 11 and in which the same reference characters are applied to corresponding components.

Figure 11A:
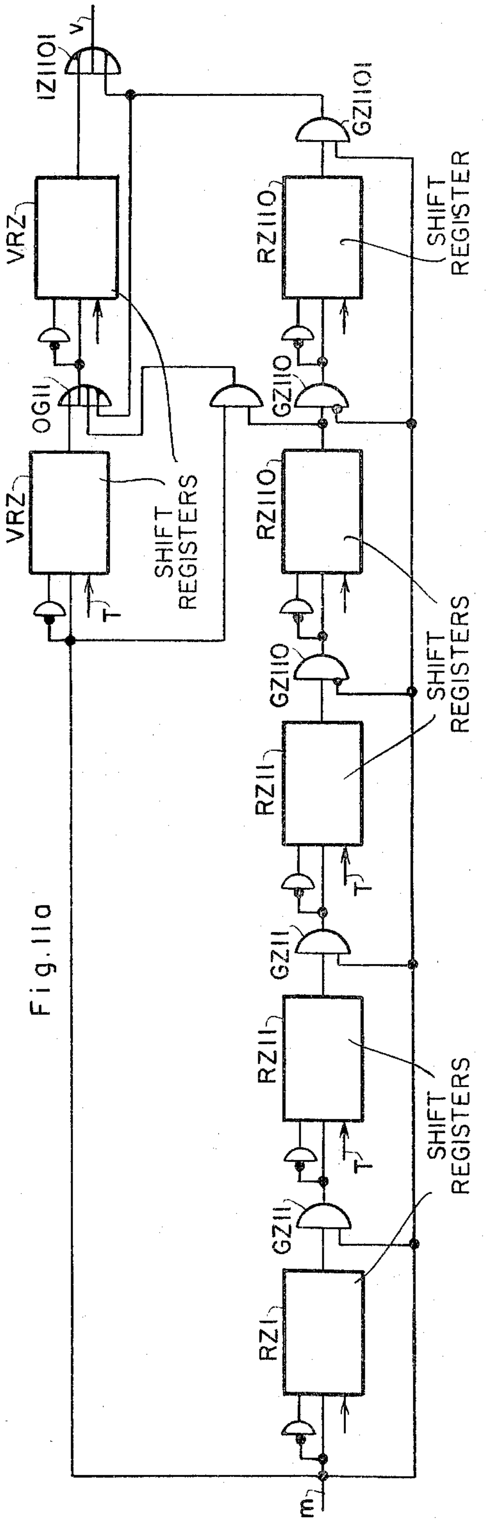

As shown in FIG. 11*a*, a plurality of shift registers RZ1, RZ11 . . . , each having a length corresponding to a scanning column, are serially connected between the signal input bus $m$ and the inhibit gate GZ110, an AND gate GZ11 being serially connected between each two of these registers. The number of the series-connected registers corresponds to the desired minimum length of the sequence of scanner signal elements "1" that is to precede the occurrence of a "0" signal element. In the example illustrated in FIG. 11*a*, only one shift register RZ11 and one AND gate GZ11 are shown added to the system according to FIG. 11, so that the combined storage capacity corresponds to a signal triplet "111," although it will be understood that any desired additional number of register-gate combinations can be added, this applying also to the registers RZ110 and VRZ described hereinafter.

By comparison with FIGURE 11 it will further be noted that a plurality of shift registers RZ110 are serially connected between the (first) inhibit gate GZ110 and the AND gate GZ1101, each of these registers having the above-mentioned one-scan storage capacity. Inserted between each two registers RZ110 is an additional inhibit gate GZ110. The number of the registers RZ110 corresponds to the chosen limit number of scanner signal elements "0" for which a signal element "1" is to be placed in readiness.

A plurality of shift registers VRZ, also having the mentioned storage capacity and being equal in number to that of registers RZ110, are connected between the signal input bus $m$ and the upper input of the OR gate 1Z1101. Preferably, as shown in FIG. 11*a*, each of the shift registers VRZ, with the exception of the first one, has its input connected to the output of the directly preceding shift register VRZ through one input of an OR gate OG11. One of the other inputs of gate OG11 is connected to the one input of the AND gate GZ1101 that receives the output signal from the serially last register RZ110; and the OR gate OG11 has further input means connected with the output of the one register RZ110 that corresponds, as to its serial position, to the preceding shift register VRZ, as well as to any one of the registers RZ110 that may serially follow the last-mentioned register RZ110. By virtue of these circuit connections, not only a sequence of scanner signal elements "0" corresponding to the chosen limit number, but also a shorter sequence of such elements "0," will result in transferring a corresponding sequence of signal elements "1" to the output lead $v$.

Instead of a single AND gate GZ1101 in a system according to FIG. 11 or FIG. 11*a*, a plurality of such AND gates can be provided together with a shift register between each two of these gates. In this case a corresponding number of shift registers can be inserted serially between the OR gate 1Z111 and the immediately preceding shift register VRZ in order to make the transfer of signal elements "1," in substitution of scanner signal elements "0," dependent upon the occurrence of not only one, but a larger minimum number of scanner signal elements "1." This modification corresponds essentially to the one illustrated in FIG. 9*b* and described above.

The system according to FIG. 10 can be modified analogously in order to recognize and store the occurrence of a given number of more than two scanner signal elements "1" on one and the same horizontal line but adjacent to each other in respectively successive scans, and to then place in readiness a signal element "1" when thereafter the scanner signal element "0" appears on the same horizontal line in a given number of next successive scans, for subsequently substituting therefor the stored signal element "1" in the event the scanner signal element "1" reappears on the same line in an immediately subsequent number of successive scans. In such a modification of the system according to FIG. 10, each of the above-mentioned inhibit gates GZ110 . . . has its output additionally connected to an input of the OR gate OGZ and furthermore each of the shift registers R1Z110, which transfer the scanner signal elements "1" from signal input bus $m$ with delay to the output lead $v$, is connected with the next following shift register of the series through an inhibit gate whose lock-out input is connected with the lockout input of the inhibit gate IZ1$v$0 to which the signal output lead $v$ is attached. Such a modification is shown in FIG. 10*a*.

As mentioned above, the invention affords the suppression of error signals stemming not only from "horizontal" interruptions of a character essentially perpendicular to the direction of the scanning columns, but also from interruptions essentially in the "vertical" direction parallel to the columns. One way of securing both effects is to pass the scanner signal elements in series through two component systems, namely one system as exemplified by FIG. 8 or 9 and a second component system as shown for example in FIG. 10 or 11. Another way of achieving the desired elimination of both kinds of error signals is to pass the scanner signal elements in parallel relation through the two component systems as is the case in the embodiment illustrated in FIG. 16.

Such a network according to the invention has its two component systems connected to one and the same signal input bus. The output of the component system whose storers have the lesser storage capacity, and which consequently eliminate essentially any signal errors resulting from "horizontal" character interruptions, is connected with the output of the other component system whose storers have the greater capacity and which eliminates the effects of "vertical" character interruptions. The connection between the respective outputs of the two component systems comprises a time-delay register whose storage capacity corresponds to the difference between the abovementioned greater and lesser capacities. This provides for travel-time equalization between the two component systems so that the time relation between the individual scanner signal elements existing on the signal input bus remains preserved in the corrected signal elements issuing from the common output lead of the system.

Figure 16:
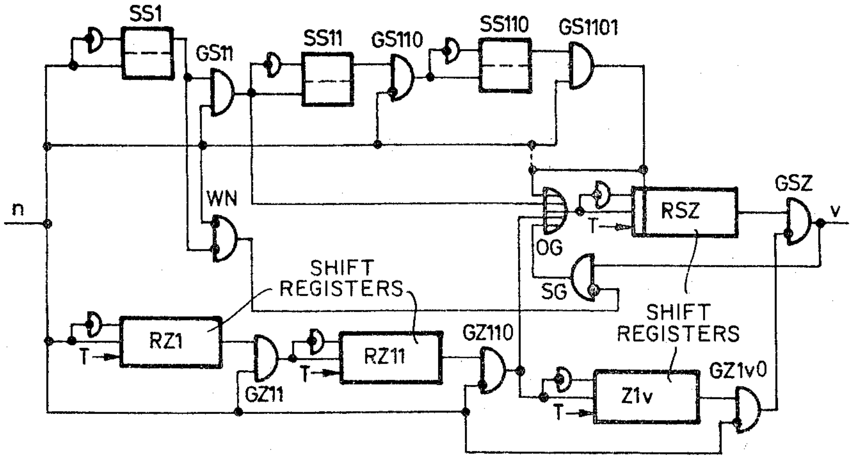
FIG. 16 is a circuit diagram of another signal-error suppression system.

The system of this type exemplified by FIG. 16 comprises essentially a component system of the type illustrated in FIG. 9 and a component system corresponding to FIG. 10. The former component system in FIG. 16, however, differs from that according to FIG. 9 in omitting the connection which in FIG. 9 extends from the signal input bus through the 1-bit storer VSS and the OR gate 1S1101 to the output lead for transferring the scanner signal elements "1" from the bus to the output lead with a delay of one clock pulse. This function of the 1-bit storer VSS in FIG. 9 is performed in FIG. 16 by the first count step of the shift register RSZ which corresponds to the shift register R1Z110 of FIG. 10. No separate time-delay register is provided in the system of FIG. 16. In lieu thereof, the output of the AND gate GS1101 is connected to the input of the second count step in the shift register RSZ, as is also the case in the circuit system of FIG. 9. In this manner, the rearmost steps of the shift register RSZ in the system of FIG. 16 are also utilized as a time-delay register. Otherwise, the system according to FIG. 16 operates in its two component portions in analogy to the function described above with reference to FIGS. 9 and 10 so that, in this respect, reference may be had to the above-presented explanations.

Aside from the advantage of a simplified circuitry, the system shown in FIG. 16 affords the advantage that the shift register RSZ and the 1-bit storer SS1 are also utilized for the suppression of other error signals, such as error signals resulting from the scanning of a character portion which exhibits irregularities at its lower or upper edge, as well as error signals stemming from isolated small black areas or from small white areas isolated within a black area portion of the character.

The AND gate GS11 in the system of FIG. 16 is additionally utilized for eliminating error signals of the type just mentioned. For this purpose, the output of gate GS11, which serially follows the 1-bit storer SS1, is additionally connected to a further input of the OR gate OG immediately preceding the shift register RSZ. Furthermore, the output of shift register RSZ is connected through the inhibit gate GSZ and another inhibit gate SG with another input of the OR gate OG. The lock-out input of the intermediate inhibit gate SG is connected to the output of a NOR gate WN whose two inputs are connected with the respective two inputs of the AND gate GS11.

The operation of the last described circuit components of the system shown in FIG. 16 will be described presently with reference to FIGS. 12 to 15.

Figure 12:
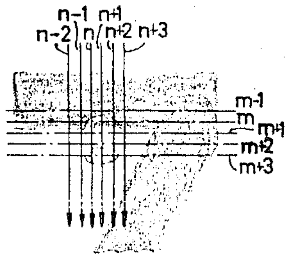
FIGS. 12 to 15 are further explanatory diagrams relating to the scanning of a character and the elimination of signal errors.

FIG. 12 shows the upper portion of numeral "7" being scanned. This illustration essentially corresponds to FIG. 1, except that the lower edge of the horizontal bar portion in the character is not regular but exhibits a defect in the form of a slight recess in the upward direction; and a small black area appears isolated below the lower edge of the same bar portion. During scanning, the recess causes the production of scanner signal elements "0" which would not occur when scanning an ideally shaped character "7" and which therefore constitute error signals. When the black island is being scanned, there occur scanner signal elements "1" which likewise constitute error signals.

Error signals of this kind are suppressed by a system as shown in FIG. 16 by the following operations.

Each scanner signal element passes from the signal input bus $n$ to one input of AND gate GS11, one input of NOR gate WN, and the input of the 1-bit storer SS1. The scanner signal element immediately preceding in the same scan appears simultaneously in the output of the same storer SS1. If these two directly successive scanner signal elements are both "1" elements, the AND gate GS11 is open and signal element "1" passes through gate OG into the shift register RSZ.

The signal element "1" is now shifted through the shift register RSZ, in step with the synchronized operation of the entire system, until, after an interval of time as required for scanning a single column, the signal emerges at the output of register RSZ and hence also at the output of the now open inhibit gate GSZ. Thence this signal element "1" is written through the OR gate OG back into the shift register RSZ, unless at this moment the inhibit gate SG is blocked to prevent re-entry.

Since the lock-out input of the inhibit gate SG is connected to the NOR gate WN, the rewriting of a signal element "1" once passed through the shift register RSZ is always prevented whenever a scanner signal element "0" appears at the particular moment on the signal bus $n$ in immediate succession to another scanner signal element "0" in the same scanning column. This is because at this moment the signal condition "0" obtains on the signal input bus $n$ as well as on the output of the 1-bit storer SS1, so that the coincidence condition is satisfied for the NOR gate WN.

It follows from the foregoing that when the column $N-2$ according to FIG. 12 is being scanned, there occurs a scanner signal element "1" at the moment when the scanning point arrives at the height of the horizontal line $m$; and this signal element "1" appears on the signal-bus input of the AND gate GS11 as well as on its other input which is connected with the output of the storer SS1. That is, the first mentioned input of gate GS11 receives the scanner signal element "1" from bus $n$ corresponding to the black character area element situated in scan $n-2$ and line $m$; and the other input receives the scanner signal element "1" which is defined by scan $n-2$ and line $m-1$ and likewise corresponds to a black area element of the character. At the moment when the scanning point in scan $n-2$ arrives at the height of line $m$, the coincidence condition is thus established for the AND gate GS11. At this moment, therefore, a signal element "1" is written into shift register RSZ.

Now assume that, as the scanning proceds in column $n-2$, the scanning point arrives at line $m+3$. Under the conditions represented in FIG. 12, the coincidence condition is now met for the NOR gate WN, and no signal element "1" is written into shift register RSZ. In the course of the following scan $n-1$, the events described in the foregoing with reference to scan $n-2$ are repeated.

Now assume that during further scanning of the character portion shown in FIG. 12, the scanning point in the next scanning column $n$ again arrives at the height of line $m$. The bus $n$ of the system now receives a scanner signal element "0." Simultaneously the directly preceding scanner element "1" appears at the output of the 1-bit storer SS1. This does not establish coincidence for the AND gate GS11, so that no signal element "1" is transferred from the output of gate GS11 to the input of shift register RSZ.

A signal element "1" is nevertheless written into this register RSZ, namely the one signal element that was previously written into the shift register RSZ during scanning of the preceding column $n-1$ at the height of line $m$ and that just now appears at the output of shift register RSZ from which it is again written back into the input of the same register RSZ through the now open inhibit gates GSZ, SG, and the OR gate OG. Consequently, a signal element "1" is written into the shift register RSZ despite the fact that the corresponding area element determined by scan $n$ and line $m$ is not covered by the character but lies in the defective white recess of the character portion.

After the next scanning step when the scanning column $n$ has arrived at line $m+1$, a scanner signal element "0" occurs on the signal bus $n$ as well as at the output of the 1-bit storer SS1, so that now coincidence is established for the NOR gate WN.

As a result, the inhibit gate SG is blocked so that any signal element "1" as might now occur at the output of shift register RSZ could not be transferred through the inhibit gate SG and would not be again written into the shift register RSZ.

After a further scanning step (clock pulse), namely when the scanning point in column $n$ has arrived at line $m+2$, the events just described are repeated. When upon another step the scanning point in scan $n$ arrives at line $m+3$, an area element of the isolated black spot is encountered so that a scanner signal element "1" appears on the input bus $n$ of the system according to FIG. 16. However, this does not establish coincidence for the AND gate GS11 because the immediately preceding scanner signal element was a "0" element. At this moment, therefore, no signal element "1" appears at the output of the AND gate GS11. Likewise no signal element "1" appears at the output of the shift register RSZ because, when line $m+3$ in the preceding scan $n-1$ was reached, the coincidence condition for the NOR gate WN was met so that the inhibit gate SG was blocked and therefore no signal element "1" was written to the shift register RSZ. Consequently, when line $m+3$ in scan $n$ is reached, no scanner signal element "1" is written into the shift register RSZ, although the area element then determined by scan $n$ and line $m+3$ is black. In this manner, the error signal produced by the isolated black spot is suppressed.

When during further scanning the scanning point in the next following column $n+1$ arrives at the height of line $m$, the coincidence condition is not satisfied for the AND gate GS11, nor for the NOR gate WN. At this moment there just occurs a signal element "1" at the output of shift register RSZ, this being the one signal element "1" which was rewritten into the register RSZ in the preceding scan at height $m$. The latter signal element "1" is now again written into the register RSZ through the now open inhibit gate SG.

The further scanning in columne $n+1$ takes place analogously to the events described above with reference to scan $n$; and when the area element of the isolated black spot in scan $n+1$ and line $m+3$ is reached, again no signal element "1" is written into the shift register RSZ. The system operates in the same manner when the next following column $n+2$ is being scanned. No irregularities of the character portion according to FIG. 12 occur in the subsequent scanning column $n+3$ so that the system need no longer function to suppress error signals.

By virtue of the above-described performance, the system exemplified by FIG. 16 also suppresses error signals as may be caused by irregularities in the upper edge of a character portion being scanned, or stemming from white area elements that appear isolated within a black area portion of the character.

Figure 13:
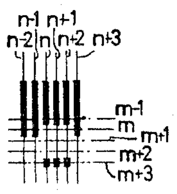
Figure 14:
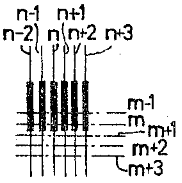
Figure 15:
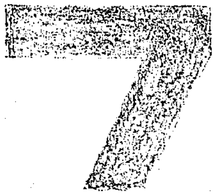

The signal elements "1" written into the shift register RSZ in the manner explained above, thus pass from the output of this register through the inhibit gate GSZ to the signal output lead $v$. If the signal input bus $n$ of the system according to FIG. 16 is supplied with scanner signal elements as schematically represented in FIG. 13, the corrected signal elements available on the output lead $v$ correspond to those indicated in FIG. 14 and are delayed, relative to the scanner signals arriving on bus $n$, by an interval of time corresponding to the duration of a single scan. A comparison of FIGS. 14 and 13 will show that the error signals resulting from the defective recess of a character portion and discernible in FIG. 13 no longer appear in the corrected signals. Also eliminated from the corrected signals are the errors resulting from the scanning of an isolated black area as exemplified in FIG. 12. Consequently the signal elements issuing on the output lead $v$ of the system correspond to those obtained if a regular character portion as represented in FIG. 15 had been scanned. Thus the character defects are made ineffective with respect to any character-identifying circuitry connected to the output lead $v$ (for example an identifying network of the type described in the copending application Serial No. 358,498, filed April 9, 1964, assigned to the assignee of the present invention).

It should be noted that if the shift register RSZ and the 1-bit storer SS1 are employed for the additional suppression of further error signals in the manner apparent from FIG. 16, the upper input of the OR gate OG serially preceding the register RSZ is no longer connected directly with the signal input bus as is the case in the system of FIG. 10, but instead is connected with the input of the second stage of the shift register RSZ and consequently to the output of the AND gate GS1101. It is by virtue of this fact that, on the one hand, any scanner signal elements resulting from isolated black areas according to FIG. 12 are suppressed and that, on the other hand, immediately after scanning a character interruption as shown in FIG. 1, a signal element "1" is written into the first stage of the shift register RSZ, although at this moment the coincidence condition for the AND gate GS11 is not satisfied under the conditions represented in FIG. 1, for example when the scanning point encounters the area element defined by scan $n$ and line $m+1$. In this manner, any broadening or displacement of a character interruption according to FIG. 1 is avoided, and it is made certain that character interruptions according to FIG. 1 as well as interruptions according to FIG. 4 and, additionally, irregularities and disturbances of the character appearance according to FIG. 12 are eliminated by mutual coaction of all of the circuit components in the system shown in FIG. 16.

To those skilled in the art it will be obvious upon a study of this disclosure that our invention permits of a great variety of modifications and hence can be given embodiments other than particularly illustrated and described herein, without departing from the essential features of our invention and within the scope of the claims annexed hereto.

We claim:

1. A scanner signal transfer system for suppressing signal errors due to slight interruptions in characters being identified from "1" and "0" signal elements produced by scanning, which comprises a signal input bus, delay means connected to said bus for transferring the arriving scanner signal elements to an output within a delay interval corresponding to a given number of scanning-travel progressions in a given coordinate direction; further means connected to said bus for identifying and storing the occurrence of sequences of arriving scanner signal elements "1" that reach a given minimum number along a line of the scanning area in said given coordinate direction; means for identifying the subsequent arrival of scanner signal elements "0" from the same line; means for placing in ready condition a signal element "1" for a given limit number of such identified "0" elements; and means for substituting during transfer the readied "1" element for the positionally corresponding ones of said identified "0" elements in the event a given minimum number of positionally adjacent signal elements "1" recurs along said line during the transfer delay interval.

2. A scanner signal transfer system for suppressing signal errors caused by defects in characters being identified from "1" and "0" signal elements produced by scanning, which comprises delay means for transferring the arriving scanner signal elements to an output within a time delay interval corresponding to a scanning step along a scanning column; means for identifying and storing the occurrence of pairs of arriving scanner signal elements "11" stemming from area elements mutually adjacent along a scanning column; means for identifying the subsequent arrival of a scanner signal element "0" from the same scanning column; means for placing a signal element "1" in ready condition for said identified "0" element; and means for substituting during delayed transfer the readied "1" element for said identified "0" element in the event a scanner signal element "1" recurs in a position corresponding to that of said "0" element.

3. A scanner signal transfer system for suppressing signal errors caused by defects in characters being identified from "1" and "0" signal elements produced by scanning, which comprises a signal input bus, delay means connected to said bus for transferring the arriving scanner signal elements to an output within a time delay interval corresponding to the length of a scanning column; further means connected to said bus for identifying and storing the occurrence of pairs of arriving scanner signal elements "11" stemming from area elements adjacent to each other in two successive scanning columns respectively; means for identifying the occurrence of a positionally adjacent scanner signal element "0" during scanning of the following column; placing a signal element "1" in ready condition for said identified "0" element; and means for substituting during delayed transfer the readied "1" element for said identified "0" element in the event a scanner signal element "1" recurs in a position corresponding to that of said "0" element.

4. A scanner signal transfer system for suppressing error signals caused by defects in characters to be identified from "1" and "0" signal elements produced by columnar scanning, comprising a signal input bus; first storer means connected to said bus to receive the scanner signal elements, said first storer means having a bit storage capacity corresponding to a given scanning travel progression for issuing the stored signal elements after a delay corresponding to the length of said progression; an inhibit gate connected to said first storer means to receive the delayed signal elements therefrom and having a lockout input connected to said bus; second storer means of said capacity connected to the output of said inhibit gate; third storer means of said capacity, and means connecting said third storer means to said bus; a coincidence gate network having a signal output lead to provide the corrected output signals and having respective inputs connected to the output of said second storer means and to the output of said third storer means and to said bus, said gate network being conductive between said third storer means and said signal output lead only at coincidence of a given minimum number of scanner signal elements "1" in said bus with simultaneous activation of said second storer means, whereby corrected scanner signals are passed from said third storer means to said output lead.

5. A scanner signal transfer system according to claim 4, comprising an OR gate interposed between said bus and said third storer means to pass signal elements from said bus, said OR gate having an input connected to the output of said inhibit gate; and said gate network comprising a first inhibit gate for passing signal elements from said third storer means to said output lead, and a second inhibit gate for passing lockout pulses from said second storer means to said first inhibit gate.

6. A scanner signal transfer system for suppressing error signals caused by defects in characters to be identified from "1" and "0" signal elements produced by columnar scanning, comprising a signal input bus; first storer means connected to said bus to receive the scanner signal elements, said first storer means having a bit storage capacity corresponding to a given scanning travel progression for issuing the stored signal elements after a delay corresponding to the length of said progression; an AND gate having inputs connected to said first storer means and to said bus respectively; intermediate storer means of said capacity connected to the output of said AND gate; a main inhibit gate having a main input connected to said intermediate storer and having a lockout input connected to said bus; second storer means of said capacity connected to the output of said inhibit gate; third storer means of said capacity and means connecting said third storer means to said bus; a coincidence gate network having a signal output lead to provide the corrected output signals and having respective inputs connected to the output of said second storer means and to the output of said third storer means and to said bus, said gate network being conductive between said third storer means and said signal output lead only at coincidence of a given minimum number of scanner signal elements "1" in said bus with simultaneous activation of said second storer means, whereby corrected scanner signals are passed from said third storer means to said output lead.

7. In a scanner signal transfer system according to claim 6, said gate network comprising an AND gate having inputs connected to said bus and to the output of said second storer means respectively, and an OR gate having inputs connected to the outputs of said latter AND gate and of said third storer means respectively, said signal output lead being connected to the output of said latter OR gate.

8. A scanner signal transfer system according to claim 6, comprising a plurality of said intermediate storer means of which each has said storage capacity and which are serially connected between said AND gate and said main inhibit gate, and another AND gate serially interposed between each two of said intermediate storer means and having an input connected to said bus.

9. A scanner signal transfer system according to claim 6, comprising a plurality of said second storer means of which each has said storage capacity and which are serially connected between said main inhibit gate and said gate network, another inhibit gate being interposed between each two of said second storer means and having a lockout input connected to said bus; and comprising the same plurality of said third storer means of which each has said storage capacity and which are connected in series with each other.

10. A scanner signal transfer system according to claim 6, comprising a plurality of said second storer means of which each has said storage capacity and which are serially connected between said main inhibit gate and said gate network, another inhibit gate being interposed between each two of said second storer means and having a lockout input connected to said bus; and comprising the same plurality of said third storer means of which each has said storage capacity and which are serially connected to each other; an OR gate serially interposed in the output of each individual one of said third storer means for passing delayed scanner signals to each serially next one of said storer means and to said output lead respectively, further AND gates having respective inputs connected to said bus, said OR gate having inputs connected through said respective latter AND gates with the outputs of said respective individual second storer means.

11. In a scanner signal transfer system according to claim 6, said gate network comprising a second inhibit gate having a main input connected to the output of said second storer means and having a lockout input connected to said bus, and a third inhibit gate having a main input connected to the output of said third storer means and having a lockout input connected to the output of said first inhibit gate, said signal output lead being connected to the output of said third inhibit gate.

12. A scanner signal transfer system according to claim 11, comprising a plurality of said second storer means of which each has said storage capacity and which are serially connected between said main inhibit gate and said second inhibit gate, another inhibit gate being interposed between each two of said second storer means and having a lockout input connected to said bus; and comprising the same plurality of said third storer means of which each has said storage capacity and which are serially connected between said bus and said third inhibit gate; an OR gate interposed between said bus and the first one of said third storer means, said OR gate having an input connected to the output of said main inhibit gate; and an inhibit gate between each two successive ones of said third storer means, each of said latter inhibit gates having a lockout input connected to the output of said second inhibit gate.

13. A scanner signal transfer system for suppressing errors in signals resulting from columnar scanning of characters to be identified, comprising two component systems according to claim 6 having a signal input bus in common, said storer means in one of said component systems having a lesser bit-storage capacity than those of the other; said system comprising a time-delay register connected between the respective output leads of said two component systems and having a storage capacity corresponding to the difference between the storage capacities of said respective storer means in said two component systems.

14. In a scanner signal transfer system according to claim 13, the one component system whose storer means have the greater storage capacity comprising respective shift registers to constitute said storer means, said shift register which forms said third storer means in said one component system having its rear storage steps connected to said third storer means of the other system to also form said time-delay register.

15. In a scanner signal transfer system according to claim 13, the other component system whose storer means have the lesser storage capacity comprising respective 1-bit storers to constitute said storer means; an AND gate having two inputs connected to said bus and to the output of said third 1-bit storer respectively; said third shift register having a second count-step input connected to the output of said latter AND gate.

16. A scanner signal transfer system according to claim 15, comprising a NOR gate having two inputs connected with the respective inputs of said AND gate which follows upon said first 1-bit storer of said other component system; an OR gate interposed between said main inhibit gate and said third shift register of said one component system, said OR gate having its output connected to the input of said third shift register and having four inputs of which one is connected to the output of said latter main inhibit gate, the second and third OR gate inputs being connected respectively to the input of said second 1-bit storer and to the output of said AND gate of said other component system; a further inhibit gate having its output connected to the fourth input of said OR gate and having a lockout input connected to the output of said NOR gate, and means connecting the main inputs of said further inhibit gate to the output of said third shift register.

17. A scanner signal transfer system for suppressing error signals caused by defects in characters to be identified from "1" and "0" signal elements produced by columnar scanning, comprising a signal input bus; a first storer, an intermediate storer, a second storer and a third storer, all having the same bit storage capacity corresponding to a scanning progression from one area element to the next in a given coordinate direction; said first storer being connected to said bus; an AND gate having inputs connected to said bus and to the output of said first storer respectively and having an output connected to said intermediate storer; a main inhibit gate having a lockout input attached to said bus and being connected between the output of said intermediate storer and said second storer; a coincidence gate having inputs connected to said bus and to the output of said second storer respectively to pass a signal element "1" when said second storer is activated at the time a signal element "1" appears on the bus; said third storer being connected to said bus; a signal output lead; and gate means having inputs connected to said third storer and to the output of said coincidence gate for transmitting signal elements to said output lead.

18. In a scanner signal transfer system according to claim 17, each of said storers having an input and a reset input, and a negator connecting said reset input to said input of each of said storers.

19. A scanner signal transfer system for suppressing error signals caused by defects in characters to be identified from "1" and "0" signal elements produced by columnar scanning, comprising a signal input bus; respective first, intermediate, second and third 1-bit storers each having a storage capacity of one scanning step; said first storer being connected to said bus; an AND gate having inputs connected to said bus and to the output of said first storer respectively and having an output connected to said intermediate storer; a main inhibit gate having a lockout input attached to said bus and being connected between the output of said intermediate storer and said second storer, an OR gate having inputs connected to the output of said main inhibit gate and to said bus respectively and having an output connected to said third storer; a second inhibit gate having a main input connected to the output of said second storer and a lockout input connected to said bus; and a third inhibit gate having a lockout input connected to the output of said second inhibit gate and a main input connected to the output of said third storer; and a signal output lead connected to the output of said third inhibit gate to issue the corrected signals.

20. A scanner signal transfer system for suppressing error signals caused by defects in characters to be identified from "1" and "0" signal elements produced by columnar scanning, comprising a signal input bus; respective first, intermediate, second and third 1-bit storers each having a storage capacity of one scanning step; said first storer being connected to said bus; an AND gate having inputs connected to said bus and to the output of said first storer respectively and having an output connected to said intermediate storer; a main inhibit gate having a lockout input attached to said bus and being connected between the output of said intermediate storer and said second storer; another AND gate having inputs connected to said bus and to the output of said second storer respectively; and an OR gate having inputs connected to the outputs of said latter AND gate and of said third storer respectively; and a signal output lead connected to the output of said OR gate to issue the corrected signals.

21. A scanner signal transfer system for suppressing error signals caused by defects in characters to be identified from "1" and "0" signal elements produced by columnar scanning, comprising a signal input bus; respective first, intermediate, second and third shift registers each having a register length equal to that of a scan column; said first shift register being connected to said bus; an AND gate having inputs connected to said bus and to the output of said first shift register respectively and having an output connected to said intermediate shift register; a main inhibit gate having a lockout input attached to said bus and being connected between the output of said intermediate shift register and said second shift register; an OR gate having inputs connected to the output of said main inhibit gate and to said bus respectively and having an output connected to said third shift register; a second inhibit gate having a main input connected to the output of said second shift register and a lockout input connected to said bus; and a third inhibit gate having a lockout input connected to the output of said second inhibit gate and a main input connected to the output of said third shift register; and a signal output lead connected to the output of said third inhibit gate to issue the corrected signals.

22. A scanner signal transfer system for suppressing error signals caused by defects in characters to be identified from "1" and "0" signal elements produced by columnar scanning, comprising a signal input bus; respective first, intermediate, second and third shift registers each having a register length equal to that of a scan column; said first shift register being connected to said bus; an AND gate having inputs connected to said bus and to the output of said first shift register respectively and having an output connected to said intermediate shift register; a main inhibit gate having a lockout input attached to said bus and being connected between the output of said intermediate shift register and said second shift register; another AND gate having inputs connected to said bus and to the output of said second shift register respectively; and an OR gate having inputs connected to the outputs of said latter AND gate and of said third shift register respectively; and a signal output lead connected to the output of said OR gate to issue the corrected signals.

No references cited.

MAYNARD R. WILBUR, *Primary Examiner.*

DARYL W. COOK, *Examiner.*

J. E. SMITH, *Assistant Examiner.*